(12) United States Patent
Amkie et al.

(10) Patent No.: US 11,823,253 B2
(45) Date of Patent: Nov. 21, 2023

(54) SYSTEMS AND METHODS FOR PURCHASING ITEMS OR MERCHANDISE WITHIN STREAMING MEDIA PLATFORMS

(71) Applicant: Avec LLC, Bal Harbour, FL (US)

(72) Inventors: Nachume Cojab Amkie, Bal Harbour, FL (US); Gabriel Cojab Amkie, Bal Harbour, FL (US); Rina Sefchovich Sheinberg, Bal Harbour, FL (US)

(73) Assignee: AVEC LLC, Bal Harbour, FL (US)

( * ) Notice: Subject to any disclaimer, the term of this patent is extended or adjusted under 35 U.S.C. 154(b) by 83 days.

(21) Appl. No.: 17/214,349

(22) Filed: Mar. 26, 2021

(65) Prior Publication Data

US 2022/0309565 A1 Sep. 29, 2022

(51) Int. Cl.
| | | |
|---|---|---|
| *G06Q 30/0601* | (2023.01) | |
| *H04N 21/20* | (2011.01) | |
| *H04N 21/478* | (2011.01) | |
| *H04L 65/60* | (2022.01) | |
| *H04L 65/612* | (2022.01) | |
| *H04L 65/65* | (2022.01) | |

(52) U.S. Cl.
CPC ..... *G06Q 30/0641* (2013.01); *G06Q 30/0603* (2013.01); *G06Q 30/0643* (2013.01); *H04L 65/60* (2013.01); *H04L 65/612* (2022.05); *H04N 21/20* (2013.01); *H04N 21/478* (2013.01); *H04N 21/47815* (2013.01); *H04L 65/65* (2022.05)

(58) Field of Classification Search
CPC .......... G06Q 30/0641; G06Q 30/0603; G06Q 30/0643; H04L 65/4084; H04N 21/20; H04N 21/47815
See application file for complete search history.

(56) References Cited

U.S. PATENT DOCUMENTS

| | | | |
|---|---|---|---|
| 9,336,528 B2 | 5/2016 | Beaton | |
| 9,679,332 B2* | 6/2017 | Kim | G06Q 30/0254 |
| 10,021,458 B1 | 7/2018 | Taylor et al. | |
| 10,827,214 B1* | 11/2020 | Thapaliya | H04N 21/47815 |
| 11,030,657 B1* | 6/2021 | Palmer | G06Q 30/0273 |
| 11,134,316 B1* | 9/2021 | Pavlosky | H04N 21/47815 |
| 2004/0122746 A1 | 6/2004 | Charlier et al. | |

(Continued)

FOREIGN PATENT DOCUMENTS

| | | |
|---|---|---|
| IN | 193CHE2009 A | 7/2012 |
| IN | 201831036952 A | 10/2018 |
| WO | WO2020141989 A1 | 7/2020 |

*Primary Examiner* — Kristie D Shingles

(74) *Attorney, Agent, or Firm* — Keith C. Rawlins

(57) ABSTRACT

Systems and methods may be provided for purchasing items or merchandise in one or more streaming media platforms, whether through interaction between a marketplace application and a streaming platform or through a built-in marketplace and streaming platform. A user or subscriber also may pause content being accessed through a streaming media platform to search for and/or purchase items. A user or subscriber may search for and make purchases of goods, merchandise, and/or exclusive items associated with content on the streaming media platform through a bar menu, selection of a content title, presentation of categories from which to search for and select items, and/or through a home or main screen within the streaming media platform working with a marketplace application and/or a built-in marketplace and streaming platform.

20 Claims, 12 Drawing Sheets

(56) References Cited

U.S. PATENT DOCUMENTS

| | | | |
|---|---|---|---|
| 2007/0250901 A1* | 10/2007 | McIntire | H04N 21/8586 |
| | | | 725/146 |
| 2008/0181575 A1 | 7/2008 | Girard et al. | |
| 2010/0275224 A1 | 10/2010 | Sheng et al. | |
| 2011/0103374 A1* | 5/2011 | Lajoie | H04L 65/1023 |
| | | | 370/352 |
| 2011/0208616 A1* | 8/2011 | Gorman | H04N 21/8355 |
| | | | 705/27.1 |
| 2011/0225417 A1* | 9/2011 | Maharajh | H04L 65/4076 |
| | | | 713/150 |
| 2011/0295722 A1* | 12/2011 | Reisman | G06Q 30/0641 |
| | | | 705/27.1 |
| 2019/0373322 A1 | 12/2019 | Rojas-Echenique et al. | |
| 2020/0128286 A1 | 4/2020 | Anders et al. | |
| 2021/0065236 A1* | 3/2021 | Khan | G06Q 30/0253 |

* cited by examiner

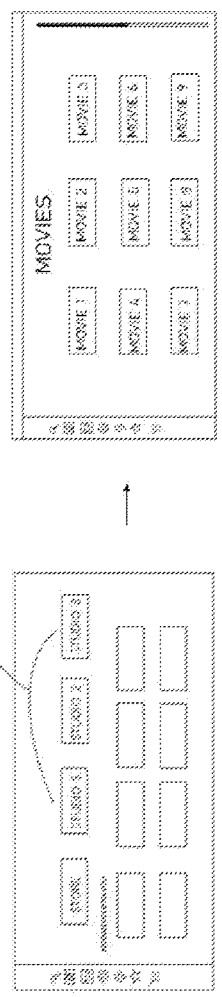
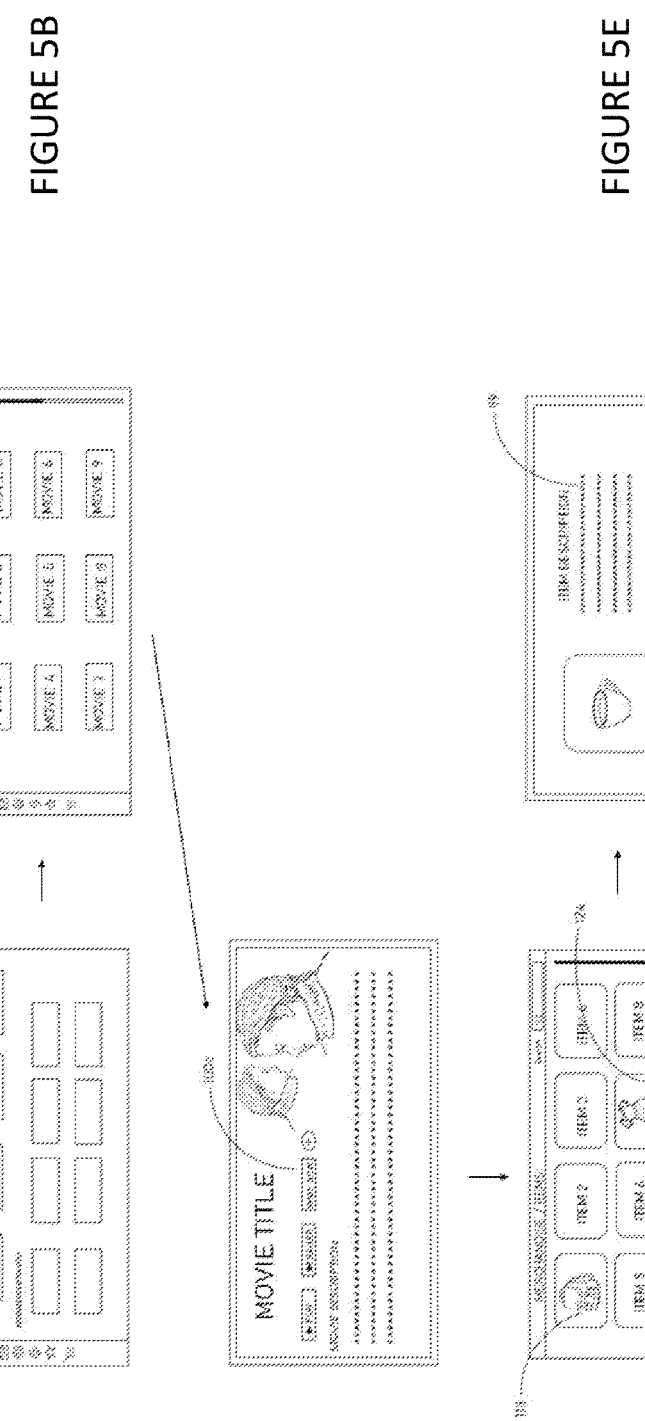
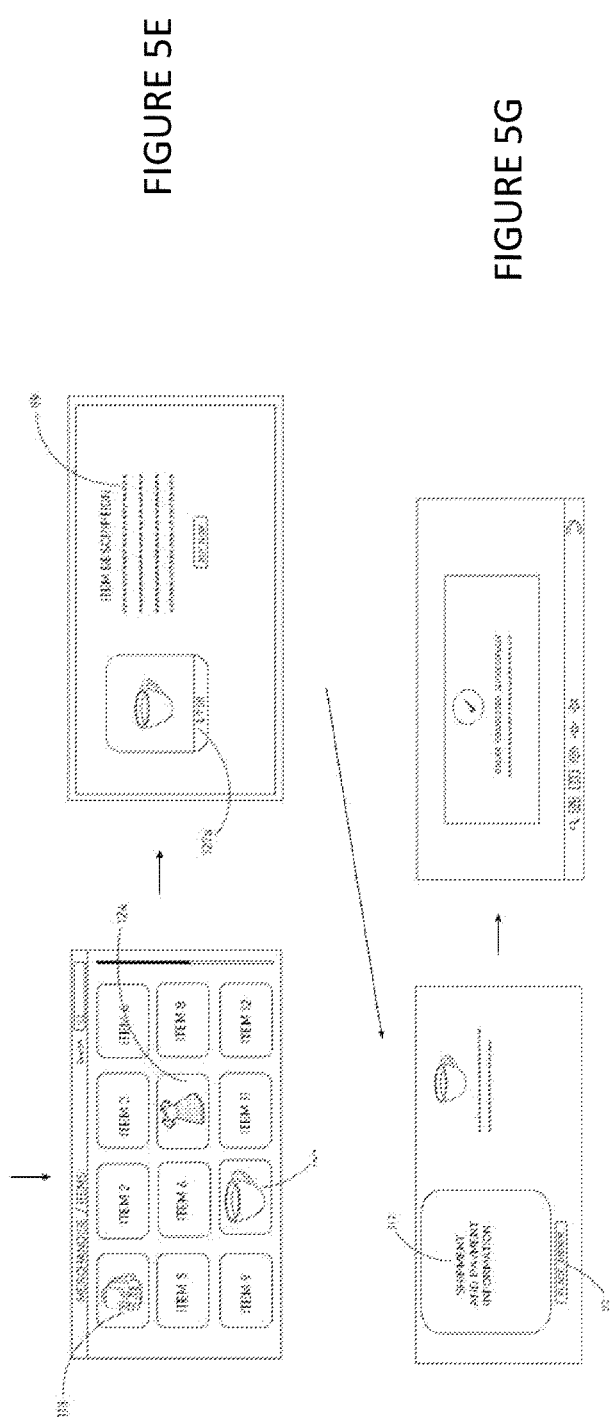
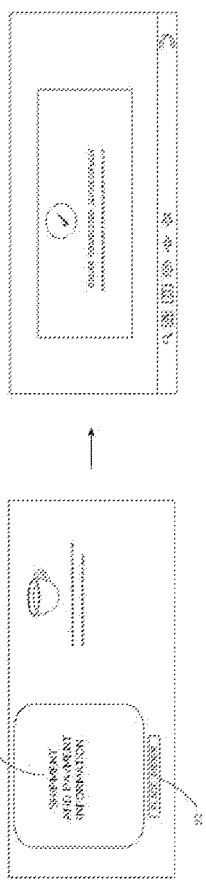
FIGURE 5A
FIGURE 5B
FIGURE 5C
FIGURE 5D
FIGURE 5E
FIGURE 5F
FIGURE 5G

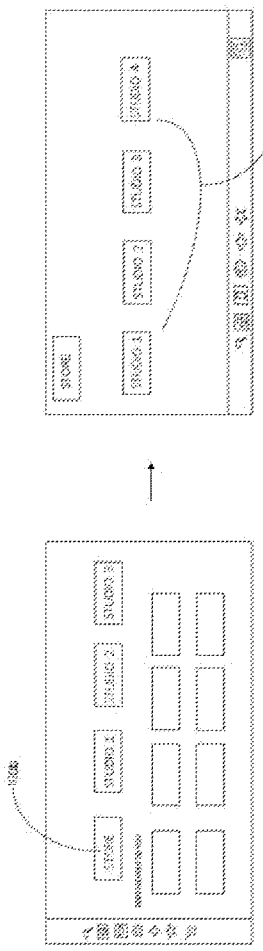
FIGURE 7A
FIGURE 7B
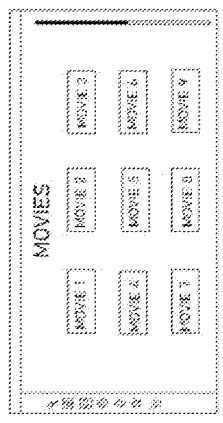
FIGURE 7C
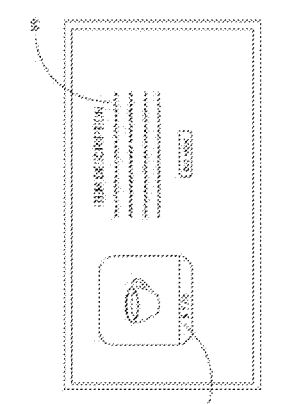
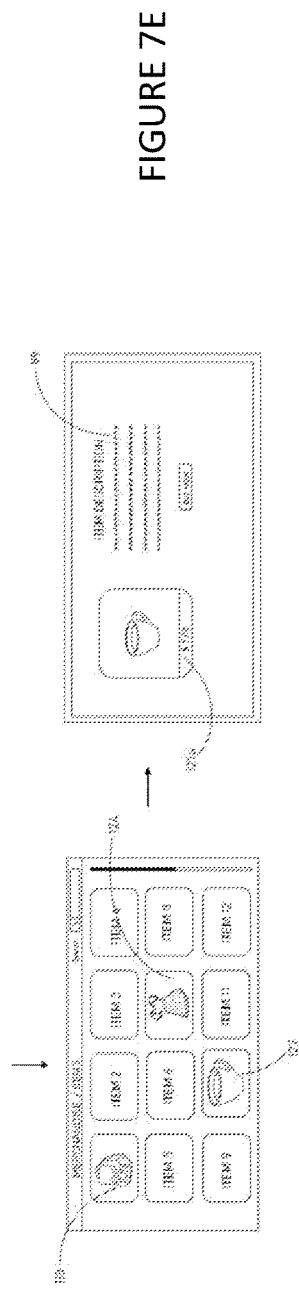
FIGURE 7D
FIGURE 7E
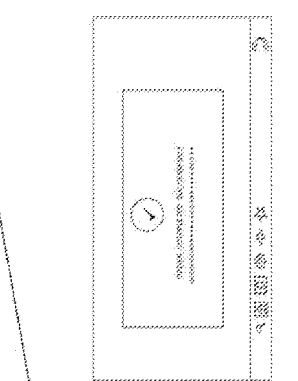
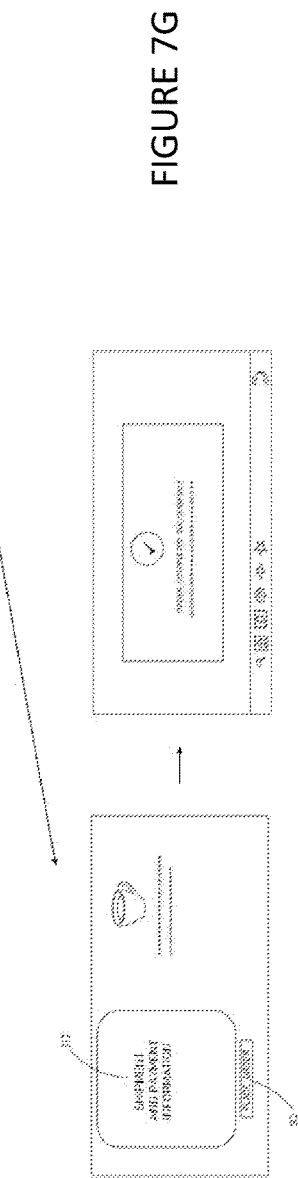
FIGURE 7F
FIGURE 7G

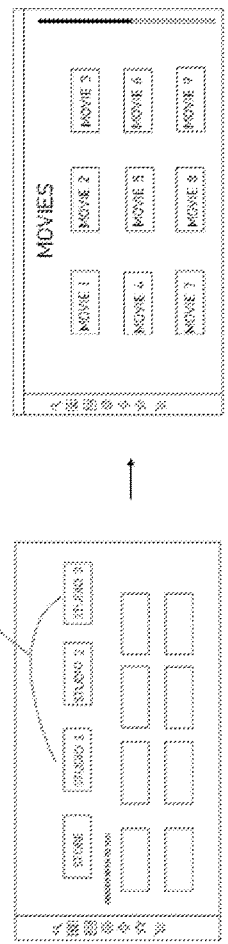
FIGURE 9A
FIGURE 9B
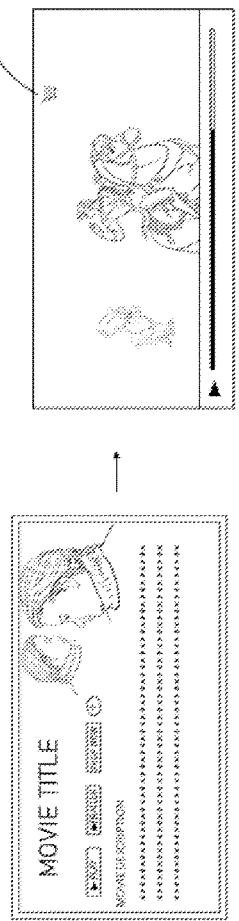
FIGURE 9C
FIGURE 9D
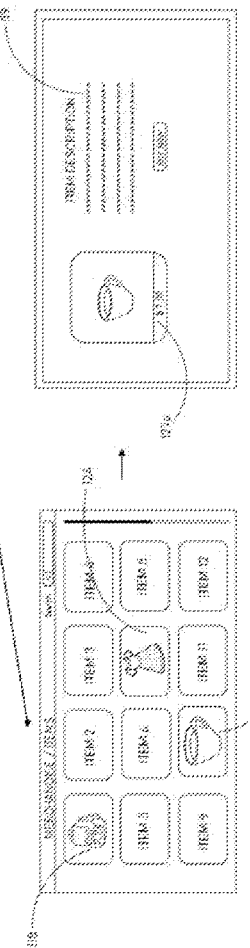
FIGURE 9E
FIGURE 9F
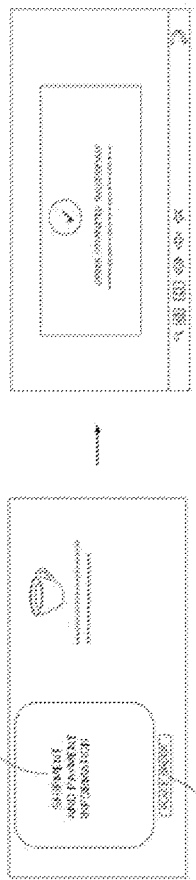
FIGURE 9G
FIGURE 9H

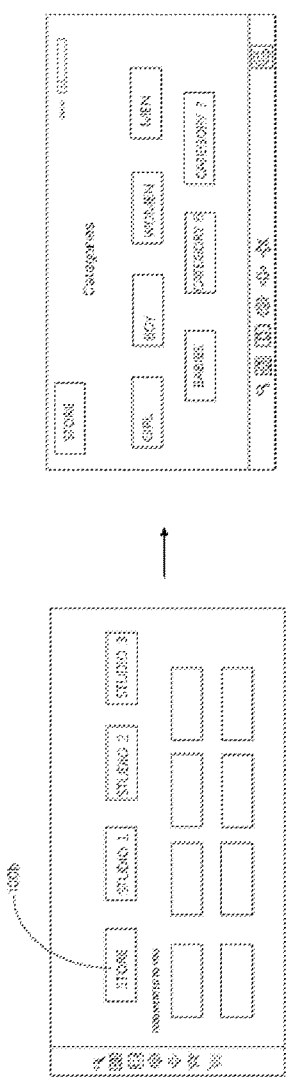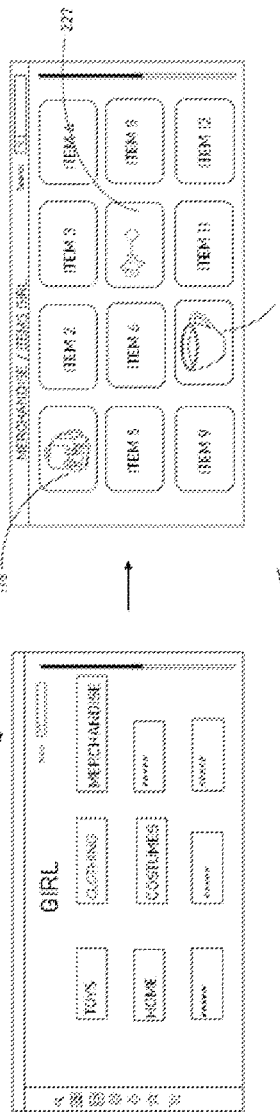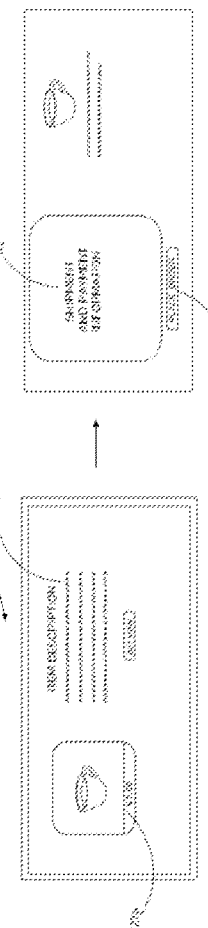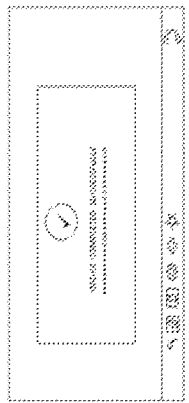
FIGURE 11A
FIGURE 11B
FIGURE 11C
FIGURE 11D
FIGURE 11E
FIGURE 11F
FIGURE 11G

SYSTEMS AND METHODS FOR PURCHASING ITEMS OR MERCHANDISE WITHIN STREAMING MEDIA PLATFORMS

FIELD OF THE DISCLOSURE

The present disclosure generally relates to purchasing items or merchandise, and more particularly to new systems and methods for shopping and purchasing items or merchandise related to the content in one or more streaming media platforms.

BACKGROUND

Streaming media generally refers to multimedia that may be constantly received by and presented to an end user over the Internet. Through streaming media, an end user may use his/her client device, such as a television, smartphone, tablet, and/or computer, to access media. Streaming is prevalent in many video-on-demand and streaming television services. Some popular streaming media platforms include Netflix, Disney+, HBO Max, Hulu, Paramount+, Peacock, Prime Video, and other sites that may stream films and television shows or where users may subscribe. These streaming media platforms were built to do just that—stream media; however, these streaming media platforms have not provided for the ability to easily search for and/or purchase items or merchandise that may be associated with the media being consumed by a user.

SUMMARY

Embodiments of the present disclosure may provide a system for purchasing one or more items within at least one streaming media platform, the system comprising: at least one marketplace application comprising: at least one database including a product catalog, marketplace application data, and business intelligence data; at least one application programming interface (API) server that may transmit information to and receive information from the at least one database; and at least one marketplace application server that may transmit information to and receive information from the at least one database; and at least one streaming media platform that may maintain content data, user data, and payment information, wherein the content data, user data, and payment information may be transmitted to the at least one API server in response to a request, wherein, using a client device, a subscriber of the at least one streaming media platform may search for and purchase through the at least one marketplace application the one or more items associated or related to content that the subscriber accesses through the streaming media platform. The client device may comprise at least one content application that may provide access to the at least one streaming media platform; and a graphical user interface (GUI) provided for the subscriber to view content transmitted from the at least one streaming media platform and search for and purchase the one or more items through the at least one marketplace application. The at least one streaming media platform may further comprise a video source that may include media servers and cache services. The user data may comprise one or more of the following: name, phone number, email address, username, password, and/or interests/preferences. The payment information maintained on the at least one streaming media platform may be used for purchases of the one or more items within the at least one marketplace application. The at least one API server may further comprise an API Gateway Service. The at least one marketplace application may further comprise one or more load balancers that may facilitate transfer of information between the at least one marketplace application and the client device over a communication network. The subscriber may search for and purchase the one or more items through a bar menu within the at least one streaming media platform, through selection of a content title within the at least one streaming media platform, and/or through a home or main screen within the at least one streaming media platform.

Other embodiments of the present disclosure may provide a method for purchasing one or more items within at least one streaming media platform, the method comprising: using a marketplace application, presenting an items catalog to a client device of a subscriber, the items catalog associated with content provided by the at least one streaming media platform; receiving a selection of the one or more items from the client device; confirming that the subscriber opts to purchase the one or more items; and accessing payment information associated with the subscriber from the at least one streaming media platform to complete purchase of the one or more items. The method also may comprise displaying an item description and/or cost for the one or more items selected by the subscriber. The marketplace application may be accessed by the subscriber through a bar menu within the at least one streaming media platform by requesting access to content data associated with the at least one streaming media platform upon access of the marketplace application through the bar menu; upon receiving authorization to access content data, presenting the subscriber with a studio menu from which the subscriber selects a studio and then a title associated with the studio; and checking for title merchandise associated with the title to identify the items catalog to present to the subscriber. The marketplace application may be accessed by the subscriber through an input mechanism associated with a content title provided by the at least one streaming media platform. The marketplace application may be accessed by the subscriber through a home or main screen within the at least one streaming media platform by requesting access to content data associated with the at least one streaming media platform upon access of the marketplace application through the home or main screen; upon receiving authorization to access content data, presenting the subscriber with a studio menu from which the subscriber selects a studio and then a title associated with the studio; and checking for title merchandise associated with the title to identify the items catalog to present to the subscriber. The marketplace application may comprise at least one database including a product catalog, marketplace application data, and business intelligence data; at least one application programming interface (API) server that may transmit information to and receive information from the at least one database; and at least one marketplace application server that may transmit information to and receive information from the at least one database. The at least one streaming media platform may maintain content data, user data, and payment information, wherein the content data, user data, and payment information may be transmitted to the at least one API server in response to a request. The client device may comprise at least one content application that may provide access to the at least one streaming media platform; and a graphical user interface (GUI) provided for the subscriber to view content transmitted from the at least one streaming media platform and search for and purchase the one or more items through the marketplace application. The payment information maintained on the at least one streaming media platform may be used for purchases of the one or more items within the marketplace application. The marketplace application may be integrated into the at least one streaming media platform. Using the marketplace application, a category menu may be presented from which the subscriber selects the one or more items from the items catalog.

BRIEF DESCRIPTION OF THE DRAWINGS

For a more complete understanding of this disclosure, reference is now made to the following description, taken in conjunction with the accompanying drawings, in which:

FIGS. 5A-5G depict screen shots of a title method according to an embodiment of the present disclosure;

FIGS. 7A-7G depict screen shots of a home or main screen method according to an embodiment of the present disclosure;

FIGS. 9A-9H depict a method of using a system to pause within a streaming media platform to make a purchase according to an embodiment of the present disclosure;

FIGS. 11A-11G depict a method of using the system of FIG. 10A according to an embodiment of the present disclosure.

DETAILED DESCRIPTION

Figure 1A:
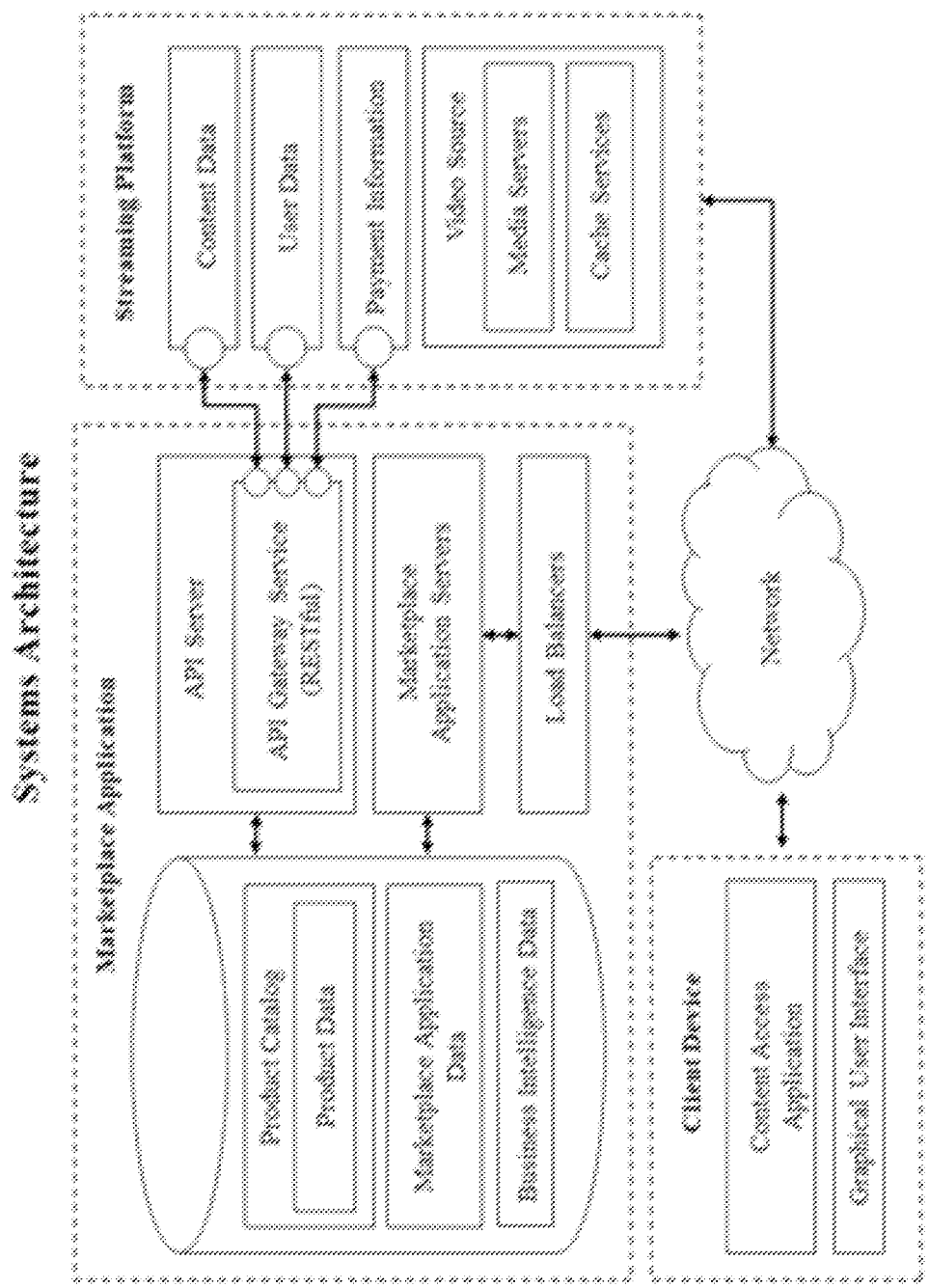
FIG. 1A depicts a general system architecture according to an embodiment of the present disclosure.

Embodiments of the present disclosure may provide systems and methods for purchasing items or merchandise in one or more streaming media platforms. A user or subscriber of a streaming media platform may utilize an onscreen menu to search for and/or directly purchase goods, merchandise, and/or exclusive items that may be associated or related to the media that the user or subscriber accesses through the streaming media platform. A user also may pause content being accessed through a streaming media platform to search for and/or purchase items in embodiments of the present disclosure. A user may search for or be presented with an items catalog as described herein in some embodiments of the present disclosure. However, there may be other embodiments of the present disclosure where a user may be presented with categories from which to search for and/or select items for purchase as described herein.

It should be appreciated that a user or subscriber may access the onscreen menu through a remote control, a mouse, a pointer, a trackpad, or other input mechanism that may be associated with a television, smartphone, tablet, and/or computer in embodiments of the present disclosure. It also should be appreciated that the onscreen menu may be viewable through one or more client devices that may allow for viewing or accessing of streaming media including, but not limited to, a television, smartphone, tablet, and/or computer in embodiments of the present disclosure. The user or subscriber may search for and/or purchase goods, merchandise, and/or exclusive items without leaving the streaming media platform in some embodiments of the present disclosure; however, in other embodiments of the present disclosure, the user or subscriber may be directed to an e-commerce platform to complete the purchase. When the user or subscriber is ready to make a purchase, there may be embodiments of the present disclosure where the sales transaction may be completed using the user or subscriber's account information associated with the streaming media platform. However, the user or subscriber may elect to use another means for purchase (i.e., a different credit card or other form of payment) without departing from the present disclosure.

Systems and methods according to embodiments of the present disclosure may provide faster, easier, and/or more secure means to search for and/or purchase items or merchandise related to the content being offered by the streaming media platform. It should be appreciated that the same items or merchandise may be provided on more than one streaming media platform; however, there may be other items or merchandise that may be exclusive to one or more streaming media platforms in embodiments of the present disclosure.

Systems and methods according to embodiments of the present disclosure may provide for targeted promotion of goods, merchandise, exclusive items, and/or services based on the content being streamed by the user or subscriber on a given streaming media platform. There also may be systems and methods according to embodiments of the present disclosure where targeted promotion may be provided based on interests or preferences of the user or subscriber. Regardless whether the user or subscriber elects to search for merchandise or goods to be purchased based on the content that he/she accesses on the streaming media platform or the user or subscriber receives targeted promotion of goods or merchandise, systems and methods according to embodiments of the present disclosure may provide a new shopping method as well as an easier and faster way to shop and make purchases within a streaming media platform. Items or merchandise may be searched for more easily, thereby adding value to the user or subscriber's subscription to the streaming media platform.

FIG. 1A depicts a general system architecture according to an embodiment of the present disclosure. A client device may include at least one or more content applications that may provide mechanisms to access one or more streaming media platforms. The client device also may include a graphical user interface (GUI) that may be provided for a user or subscriber to view or access content provided by one or more streaming media platforms as well as search for and/or purchase items or merchandise as set forth according to systems and methods in embodiments of the present disclosure. The client device may receive and/or transmit data and information over a network which may communicate with one or more streaming media platforms and/or one or more marketplace applications as set forth in FIG. 1A.

Client devices may include various types of devices including, but not limited to, computers, smartphones, streaming devices, smart TVs, and/or video game consoles. Each one of them has their own GUI and may connect to the network through a content access application.

The one or more streaming media platforms may include all data sources associated with the platform: content data, user data, and payment information. This information may be accessible through the API, following the RESTful guidelines in some embodiments of the present disclosure. The system also may contain the video source, including, but not limited to, media servers, cache services, and video segments. The streaming media platform may be accessible through the network by client requests.

Each of the one or more streaming media platforms may include, but is not limited to, content data, user data, payment information, and a video source. The video source may include, but is not limited to, media servers and cache services. Content data may include all of the items of media that a user or subscriber may access including, but not limited to, music, video, television shows, and/or movies. User data may include account information associated with a user or subscriber including, but not limited to, the user's name, phone number, email address, username, password, and/or interests/preferences. Payment information may include a user's credit card or other information that is used to pay for the user's access to the streaming media platform. This payment information may be used for purchases of items or merchandise as described in embodiments of the present disclosure.

The one or more marketplace applications may include one or more databases that may provide product catalog data, business intelligence data, and/or marketplace application data. The one or more marketplace applications also may include marketplace application servers that may be addressed and protected from all the network traffic with load balancers. It also may include API Servers which may have API Gateway Service endpoints that follow RESTful guidelines.

Each of the one or more marketplace applications may include, but is not limited to, a product catalog, marketplace application data, and/or business intelligence data that may be stored in one or more databases. The product catalog may include product data as depicted herein. The one or more marketplace applications also may include at least one application programming interface (API) server that may include an API Gateway Service, such as RESTful (Representational State Transfer) that may leverage the HTTP protocol and model to provide data services. In embodiments of the present disclosure, REST may follow a client/server model, be stateless, cacheable, allow for a layered model, and/or provide a uniform interface. However, it should be appreciated that other API gateways may be used without departing from the present disclosure. For example, API gateways may be specific to the marketplace, such as with the Amazon or Amazon Web Services (AWS) API Gateway. As depicted in FIG. 1A, the API Gateway Service may communicate with the one or more streaming media platforms, more specifically with the content data, user data, and/or payment information that may be associated with the one or more streaming media platforms. The one or more API servers may communicate with the one or more databases within the marketplace application.

The one or more marketplace applications also may include one or more marketplace application servers and load balancers. The one or more marketplace application servers may communicate with the load balancers and/or with the one or more databases within the marketplace application. The one or more marketplace application servers may receive from and deliver marketplace application data to the one or more databases. The one or more marketplace application servers also may deliver marketplace application data to the client device over the network via the load balancers. The load balancers may also communicate with the network that provides for communication between and among the client device, the one or more marketplace applications, and/or the one or more streaming media platforms as depicted in FIG. 1.

Figure 1B:
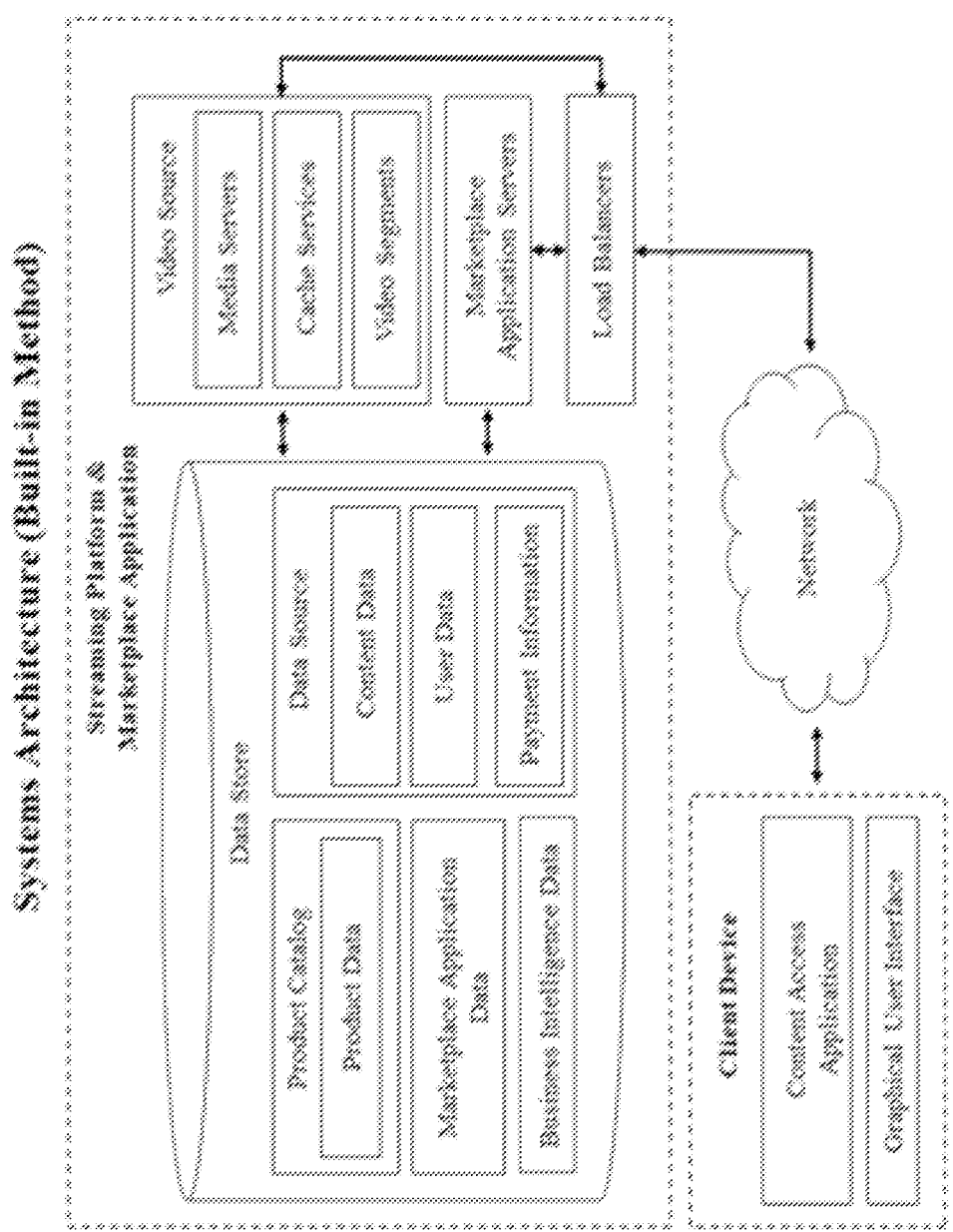
FIG. 1B depicts a built-in system architecture according to an embodiment of the present disclosure.

FIG. 1B depicts a built-in system architecture according to an embodiment of the present disclosure. The marketplace application may be built-in together with the streaming platform system. The built-in system may include one or more databases that may include product catalog data, business intelligence data, and marketplace application data as well as data sources including, but not limited to, content data, user data, and/or payment information. The built-in system also may contain the video source, including, but not limited to, media servers, cache services, and/or video segments. These servers along with the marketplace application servers may be protected and addressed by the load balancers which may distribute the network traffic and requests.

As depicted herein, a streaming platform and marketplace application may be integrated or built in. The streaming platform and marketplace application may include at least one data store that may include, but is not limited to, a product catalog having product data, marketplace application data, and business intelligence data, as well as a data source that may include content data, user data, and/or payment information. The at least one data store may communicate with a video source that may include media servers, cache services, and/or video segments. The at least one data store also may communicate with marketplace application servers, which may in turn communicate with load balancers that may transmit and receive data from a client device that may include at least one content access application and a GUI over a network as discussed above with respect to FIG. 1A.

It should be appreciated that both an API system (FIG. 1A) or a built-in system (FIG. 1B) may operate in connection with streaming media platforms supported by cloud vendors including, but not limited to, Amazon Web Services (AWS), Microsoft Azure, and/or Google Cloud in embodiments of the present disclosure.

Figure 2B:
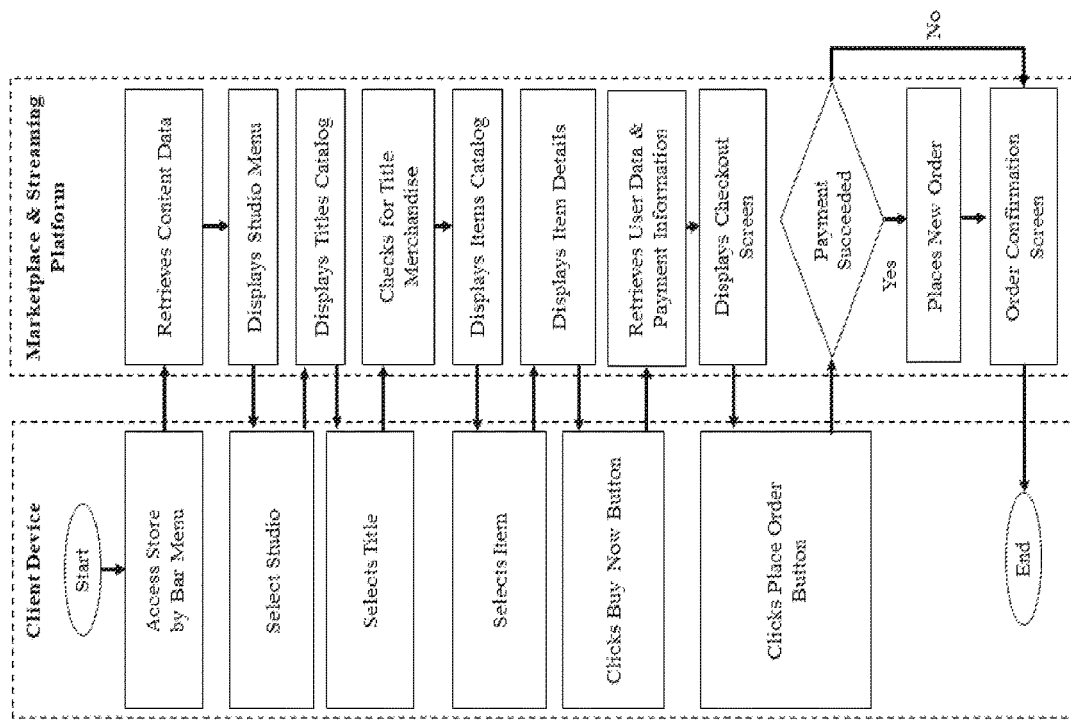
FIG. 2B depicts a built-in bar menu system according to an embodiment of the present disclosure.
Figure 2A:
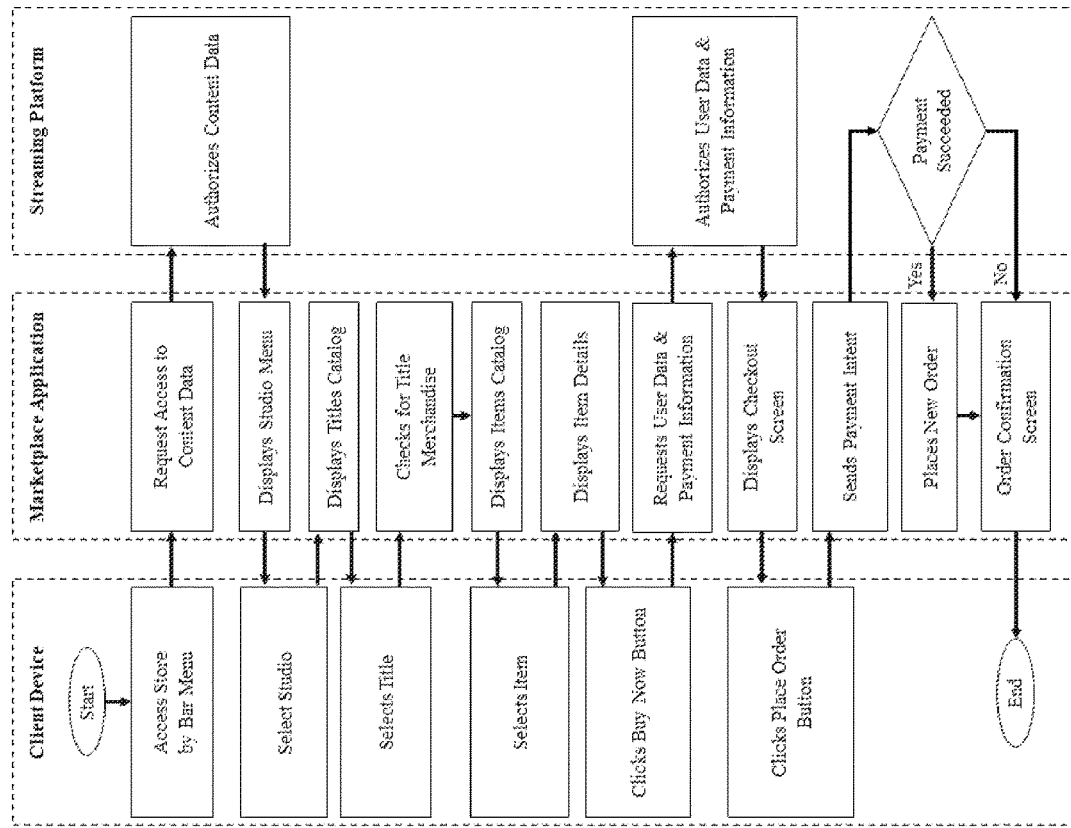
FIG. 2A depicts a bar menu system according to an embodiment of the present disclosure.

FIG. 2A depicts a bar menu system according to an embodiment of the present disclosure. A bar menu may provide access to items and/or merchandise by having a shop cart or a shop(store) reference icon on a bar menu of a streaming media platform. Using a client device, a user or subscriber may access a store (or e-commerce marketplace) through the bar menu. The marketplace application may then request access to content data, and the streaming media platform may authorize access to content data. A studio menu may then be displayed via the marketplace application from which the user or subscriber may select a studio. Upon selecting a studio via the client device, the marketplace application may provide a titles catalog for display. The user or subscriber may select a title, and the marketplace application may perform a check to identify whether items or merchandise are available that are associated with the title that has been selected. If items or merchandise are available, the user or subscriber may evaluate them and select one or more items or merchandise. In response to the selection, the marketplace application may provide more details about the selected item(s) or merchandise.

If the user or subscriber is ready to make a purchase of one or more items or merchandise, the user or subscriber may select an input, such as a "buy now" button, to indicate that he/she wants to purchase. In response to the user or subscriber's selection, the marketplace application may request user data and/or payment information. If the user or subscriber wishes to use the user data and/or payment information associated with the streaming media platform, the marketplace application may seek authorization from the streaming media platform to utilize the user data and/or payment information. Upon authorization, the marketplace application may display a checkout screen where the user or subscriber may confirm that he/she wishes to complete the purchase (i.e., through a selection of a "complete purchase" or other similar input). The payment intent may be transmitted to the streaming media platform. If the streaming media platform confirms that payment can be made, the order may be placed through the marketplace application. However, if payment is not successful, the marketplace application may return an order confirmation display to the client device to cancel the purchase or request further or other user data and/or payment information from the user or subscriber.

FIG. 2B depicts a built-in bar menu system according to an embodiment of the present disclosure. The system of FIG. 2B integrates the marketplace application and streaming platform described in FIG. 2A into a marketplace and streaming platform. Using a client device, a user or subscriber may access a store (or e-commerce marketplace) through the bar menu. The marketplace and streaming platform may then retrieve content data. A studio menu may then be displayed via the marketplace and streaming platform from which the user or subscriber may select a studio. Upon selecting a studio via the client device, the marketplace and streaming platform may provide a titles catalog for display. The user or subscriber may select a title, and the marketplace and streaming platform may perform a check to identify whether items or merchandise are available that are associated with the title that has been selected and present an items catalog to the user or subscriber. The user or subscriber may evaluate the items catalog and select one or more items or merchandise. In response to the selection, the marketplace and streaming platform may provide more details about the selected item(s) or merchandise.

If the user or subscriber is ready to make a purchase of one or more items or merchandise, the user or subscriber may select an input, such as a "buy now" button, to indicate that he/she wants to purchase. In response to the user or subscriber's selection, the marketplace and streaming platform may retrieve user data and/or payment information. The marketplace and streaming platform may display a checkout screen where the user or subscriber may confirm that he/she wishes to complete the purchase (i.e., through a selection of a "complete purchase" or other similar input). If the marketplace and streaming platform confirms that payment can be made, the order may be placed. However, if payment is not successful, the marketplace and streaming platform may return an order confirmation display to the client device to cancel the purchase or request further or other user data and/or payment information from the user or subscriber.

Figure 3A:
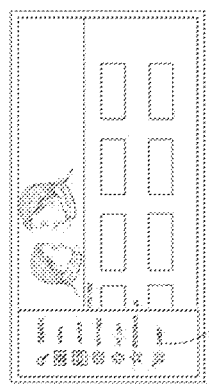
FIGS. 3A-3H depict screen shots of a bar menu method according to an embodiment of the present disclosure.
Figure 3B:
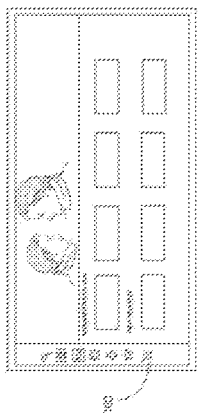
Figure 3C:
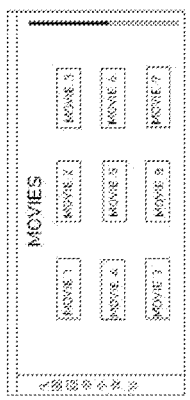
Figure 3D:
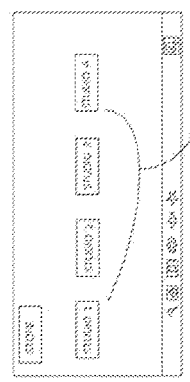
Figure 3E:
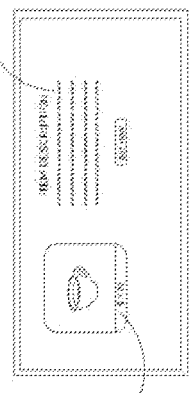
Figure 3F:
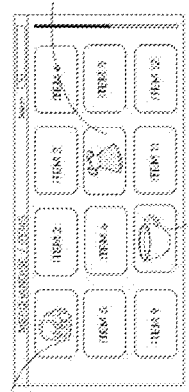
Figure 3G:
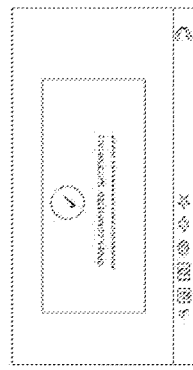
Figure 3H:
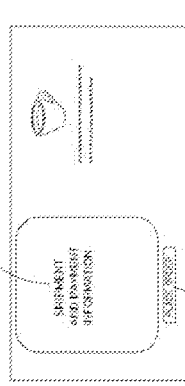

As set forth in FIGS. 3A-3H, a user or subscriber may navigate to bar menu 100 (FIG. 3A) which may include a shopping cart or other similar icon 100a (FIG. 3B). Upon navigating to the store, the user or subscriber may select an icon to be directed to a production studio or company associated with the at least one streaming media platform (FIG. 3C). It should be appreciated that there may be some embodiments of the present disclosure where only one production studio or company may be associated with the at least one streaming media platform; however, there may be other embodiments of the present disclosure where more than one production studio or company may be associated with the platform. The user or subscriber may then be able to access content related to that selected production studio or company (FIG. 3D). For example, the user or subscriber may select a movie, and the user or subscriber may then be provided with items and/or merchandise available for purchase 118, 124, 127 that may be associated with that movie (FIG. 3E). The user or subscriber also may be provided with a description of each item and/or piece of merchandise 89 and/or the cost associated with the item and/or merchandise 127a (FIG. 3F). The user or subscriber may select one or more items or merchandise, and the user or subscriber may elect to be charged using his/her current user data and/or payment information 117 associated with the at least one streaming media platform (FIG. 3G). However, the user may elect to change any of his/her user data and/or payment information if needed. The user may place the order 92 (FIG. 3G), and the system may confirm that the order is successful upon processing payment (FIG. 3H).

Figure 4B:
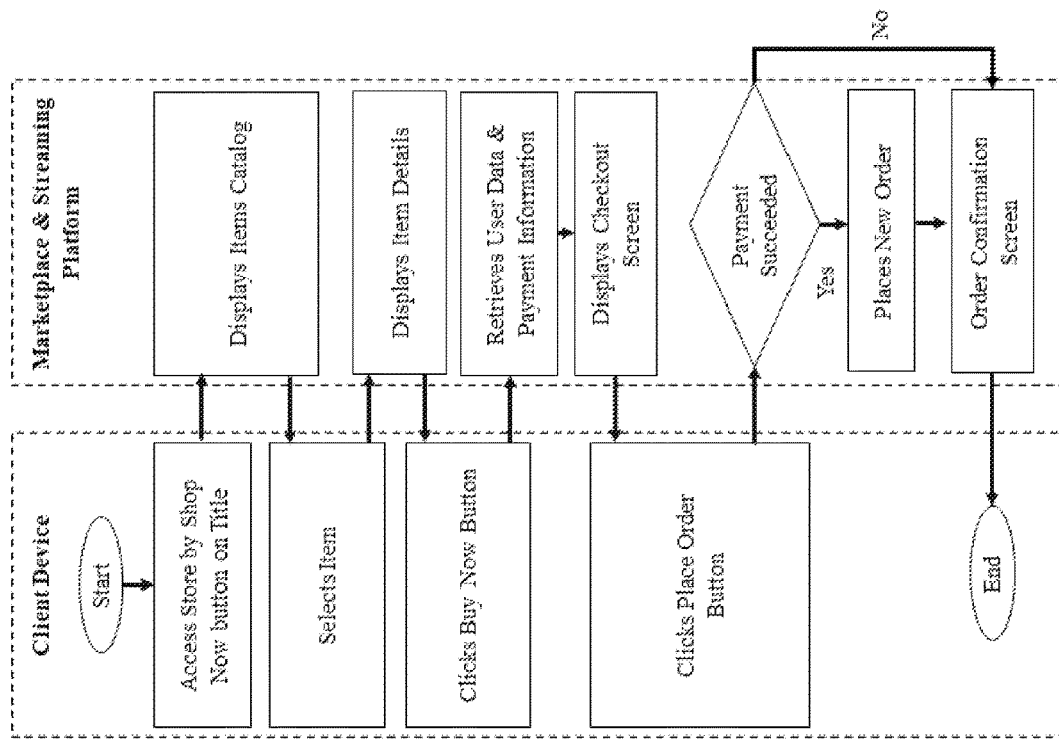
FIG. 4B depicts a built-in title menu system according to an embodiment of the present disclosure.
Figure 4A:
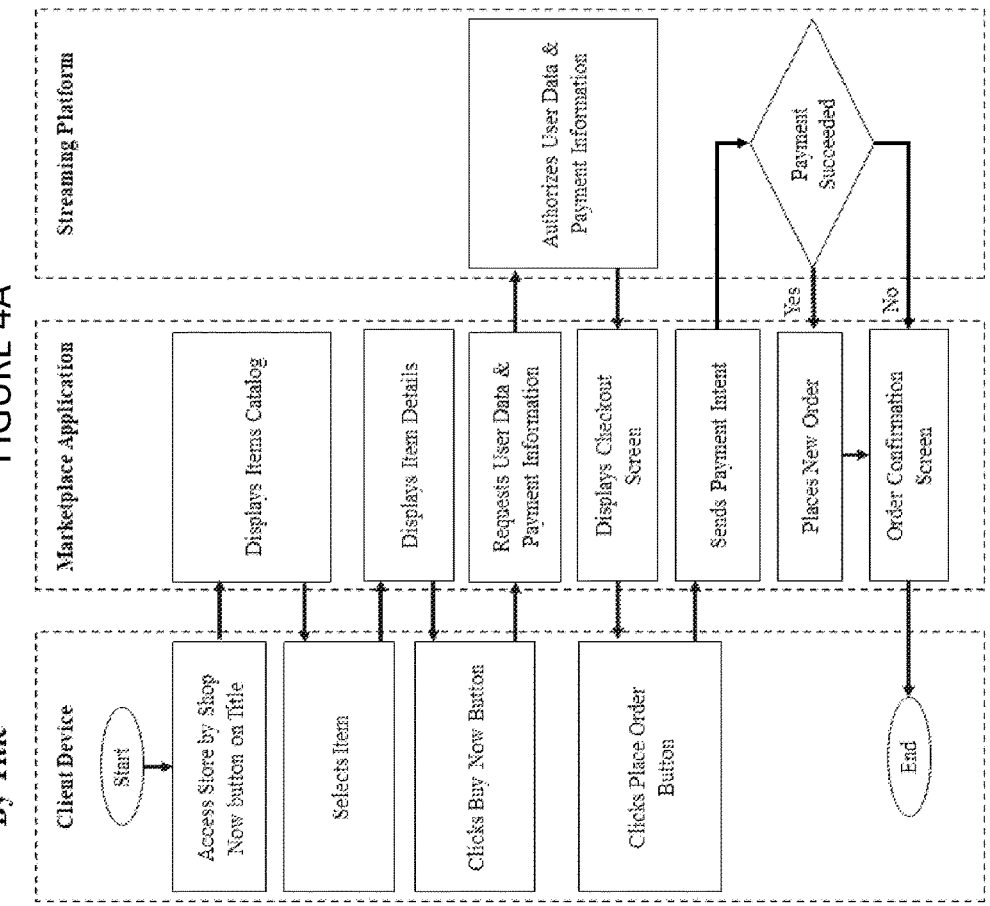
FIG. 4A depicts a title system according to an embodiment of the present disclosure.

FIG. 4A depicts a title system according to an embodiment of the present disclosure. In this embodiment of the present disclosure, a user or subscriber may be provided with access to items and/or merchandise upon selection of a content title. Using a client device, a user or subscriber may access a store (or e-commerce marketplace) through a "shop now" button or other similar input mechanism associated with the content title. The marketplace application may provide an items catalog for display. If items or merchandise are available, the user or subscriber may evaluate them and select one or more items or merchandise. In response to the selection, the marketplace application may provide more details about the selected item(s) or merchandise.

If the user or subscriber is ready to make a purchase of one or more items or merchandise, the user or subscriber may select an input, such as a "buy now" button, to indicate that he/she wants to purchase. In response to the user or subscriber's selection, the marketplace application may request user data and/or payment information. If the user or subscriber wishes to use the user data and/or payment information associated with the streaming media platform, the marketplace application may seek authorization from the streaming media platform to utilize the user data and/or payment information. Upon authorization, the marketplace application may display a checkout screen where the user or subscriber may confirm that he/she wishes to complete the purchase (i.e., through a selection of a "complete purchase" or other similar input). The payment intent may be transmitted to the streaming media platform. If the streaming media platform confirms that payment can be made, the order may be placed through the marketplace application. However, if payment is not successful, the marketplace application may return an order confirmation display to the client device to cancel the purchase or request further or other user data and/or payment information from the user or subscriber.

FIG. 4B depicts a built-in title menu system according to an embodiment of the present disclosure. The system of FIG. 4B integrates the marketplace application and streaming platform of FIG. 4A into a marketplace and streaming platform. In this embodiment of the present disclosure, using a client device, a user or subscriber may access a store (or e-commerce marketplace) through a "shop now" button or other similar input mechanism associated with a content title. The marketplace and streaming platform may provide an items catalog for display. If items or merchandise are available, the user or subscriber may evaluate them and select one or more items or merchandise. In response to the selection, the marketplace and streaming platform may provide more details about the selected item(s) or merchandise.

If the user or subscriber is ready to make a purchase of one or more items or merchandise, the user or subscriber may select an input, such as a "buy now" button, to indicate that he/she wants to purchase. In response to the user or subscriber's selection, the marketplace and streaming platform may retrieve user data and/or payment information. The marketplace and streaming platform may display a checkout screen where the user or subscriber may confirm that he/she wishes to complete the purchase (i.e., through a selection of a "complete purchase" or other similar input). If payment can be made, the order may be placed through the marketplace and streaming platform. However, if payment is not successful, the marketplace and streaming platform may return an order confirmation display to the client device to cancel the purchase or request further or other user data and/or payment information from the user or subscriber.

FIGS. 5A-5G depict screen shots of a title method according to an embodiment of the present disclosure. A user or subscriber may browse and select a studio 131 (FIG. 5A) and then a content title (FIG. 5B). Upon selection of a title, the user or subscriber may be presented with an icon, such as a "shop now" input 100c (FIG. 5C). This icon may be presented around or near the content title, and it should be appreciated that other icons may be provided on this display in embodiments of the present disclosure. The user or subscriber may then be presented with one or more items and/or merchandise 118, 124, 127 (FIG. 5D) available related to the title. The user or subscriber may select an item and be provided with a description 89 (FIG. 5E) and/or price/cost 127a (FIG. 5E). The user may choose to purchase the item by selecting the "buy now" icon or other similar input. Payment and shipment information 117 (FIG. 5F) may be displayed to the user or subscriber. This information may include, but is not limited to, name, address, and/or credit/debit card information, and the user or subscriber may confirm this information by selecting the "place order" button or other similar input 92 (FIG. 5F). The user or subscriber may then receive confirmation that the order has been placed (FIG. 5G).

Figure 6B:
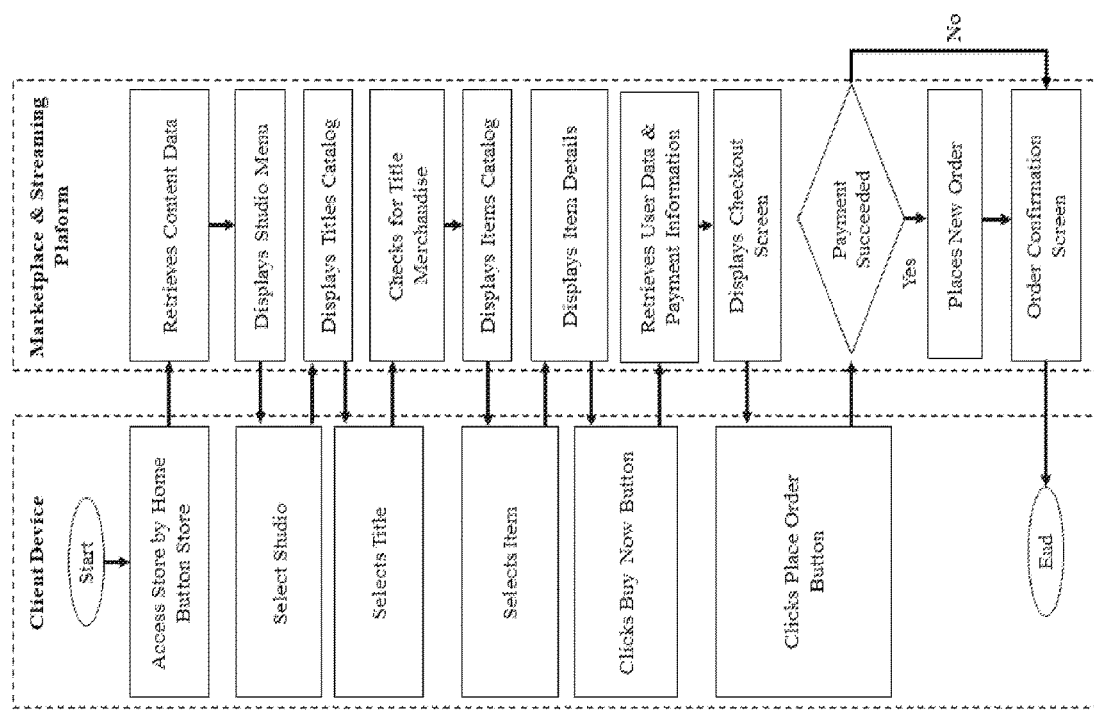
FIG. 6B depicts a built-in home or main screen system according to an embodiment of the present disclosure.
Figure 6A:
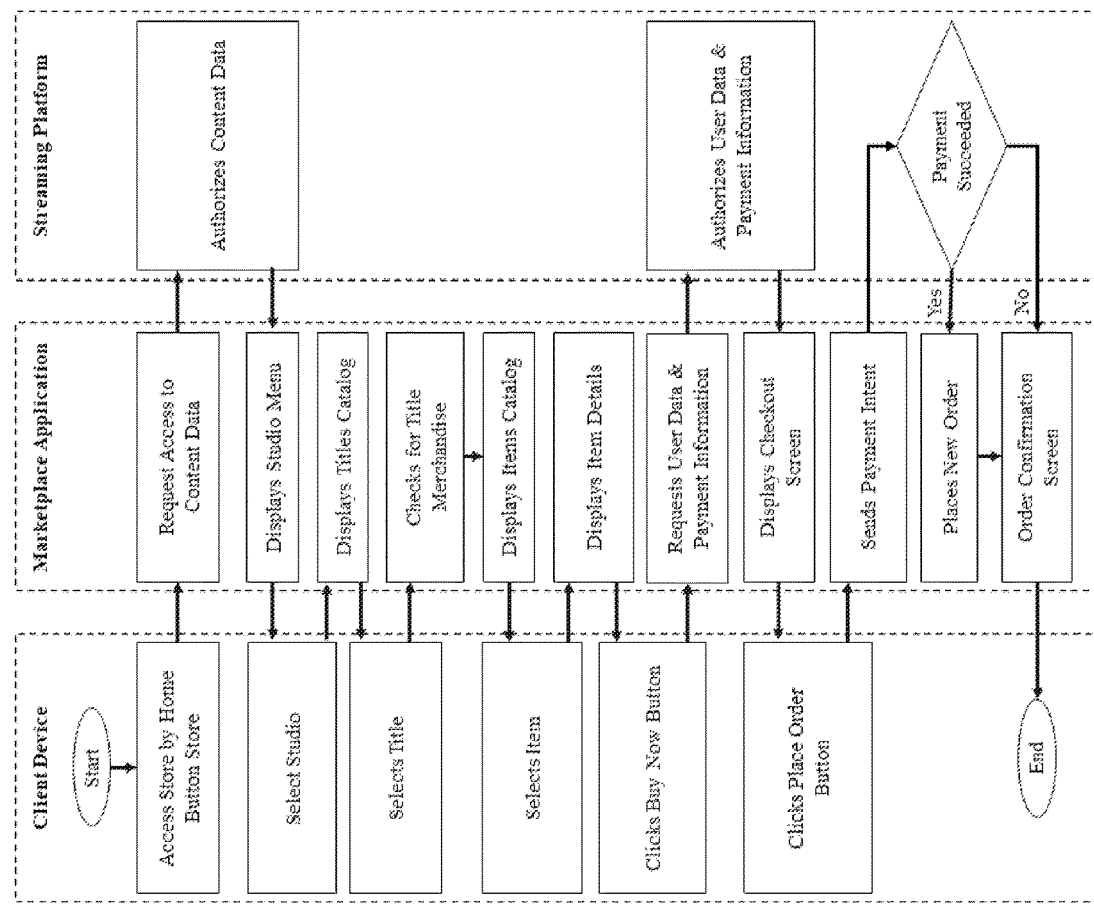
FIG. 6A depicts a home or main screen system according to an embodiment of the present disclosure.

FIG. 6A depicts a home or main screen system according to an embodiment of the present disclosure. In this embodiment of the present disclosure, a user or subscriber may be provided with access to items and/or merchandise through a home or main screen. Using a client device, a user or subscriber may access a store (or e-commerce marketplace) through the home or main screen. The marketplace application may then request access to content data, and the streaming media platform may authorize access to content data. A studio menu may then be displayed via the marketplace application from which the user or subscriber may select a studio. Upon selecting a studio via the client device, the marketplace application may provide a titles catalog for display. The user or subscriber may select a title, and the marketplace application may perform a check to identify whether items or merchandise are available that are associated with the title that has been selected. If items or merchandise are available, the user or subscriber may evaluate them and select one or more items or merchandise. In response to the selection, the marketplace application may provide more details about the selected item(s) or merchandise.

If the user or subscriber is ready to make a purchase of one or more items or merchandise, the user or subscriber may select an input, such as a "buy now" button, to indicate that he/she wants to purchase. In response to the user or subscriber's selection, the marketplace application may request user data and/or payment information. If the user or subscriber wishes to use the user data and/or payment information associated with the streaming media platform, the marketplace application may seek authorization from the streaming media platform to utilize the user data and/or payment information. Upon authorization, the marketplace application may display a checkout screen where the user or subscriber may confirm that he/she wishes to complete the purchase (i.e., through a selection of a "complete purchase" or other similar input). The payment intent may be transmitted to the streaming media platform. If the streaming media platform confirms that payment can be made, the order may be placed through the marketplace application. However, if payment is not successful, the marketplace application may return an order confirmation display to the client device to cancel the purchase or request further or other user data and/or payment information from the user or subscriber.

FIG. 6B depicts a built-in home or main screen system according to an embodiment of the present disclosure. The system of FIG. 6B integrates the marketplace application and streaming platform of FIG. 6A into a marketplace and streaming platform. Using a client device, a user or subscriber may access a store (or e-commerce marketplace) through the home or main screen. The marketplace and streaming platform may then retrieve content data. A studio menu may then be displayed via the marketplace and streaming platform from which the user or subscriber may select a studio. Upon selecting a studio via the client device, the marketplace and streaming platform may provide a titles catalog for display. The user or subscriber may select a title, and the marketplace and streaming platform may perform a check to identify whether items or merchandise are available that are associated with the title that has been selected. If items or merchandise are available, the user or subscriber may evaluate them and select one or more items or merchandise. In response to the selection, the marketplace and streaming platform may provide more details about the selected item(s) or merchandise.

If the user or subscriber is ready to make a purchase of one or more items or merchandise, the user or subscriber may select an input, such as a "buy now" button, to indicate that he/she wants to purchase. In response to the user or subscriber's selection, the marketplace and streaming platform may retrieve user data and/or payment information. The marketplace and streaming platform may display a checkout screen where the user or subscriber may confirm that he/she wishes to complete the purchase (i.e., through a selection of a "complete purchase" or other similar input). The order may be placed through the marketplace and streaming platform. However, if payment is not successful, the marketplace and streaming platform may return an order confirmation display to the client device to cancel the purchase or request further or other user data and/or payment information from the user or subscriber.

FIGS. 7A-7G depict screen shots of a home or main screen method according to an embodiment of the present disclosure. The home or main screen may include an exclusive button or other input mechanism related to a shop store (e-commerce or marketplace application) 100b (FIG. 7A). The user or subscriber may select the shop button and be directed to icons associated with one or more studios or companies offering content on the streaming media platform 125 (FIG. 7B). The user may select a studio or company and be presented with one or more pieces of content (FIG. 7C). Upon selecting a piece of content, such as a movie, the user or subscriber may be presented with one or more items and/or merchandise related to the content 118, 124, 127 (FIG. 7D). The user or subscriber may select an item and then be presented with an item description 89 (FIG. 7E) and/or cost information 127a (FIG. 7E). The user or subscriber may select the "buy now" input or other similar icon or mechanism (FIG. 7E) and may confirm his/her payment and shipment information 117 (FIG. 7F). Upon confirmation, the user or subscriber may place his/her order 92 (FIG. 7F) and then receive confirmation that the order has been placed (FIG. 7G).

Figure 8A:
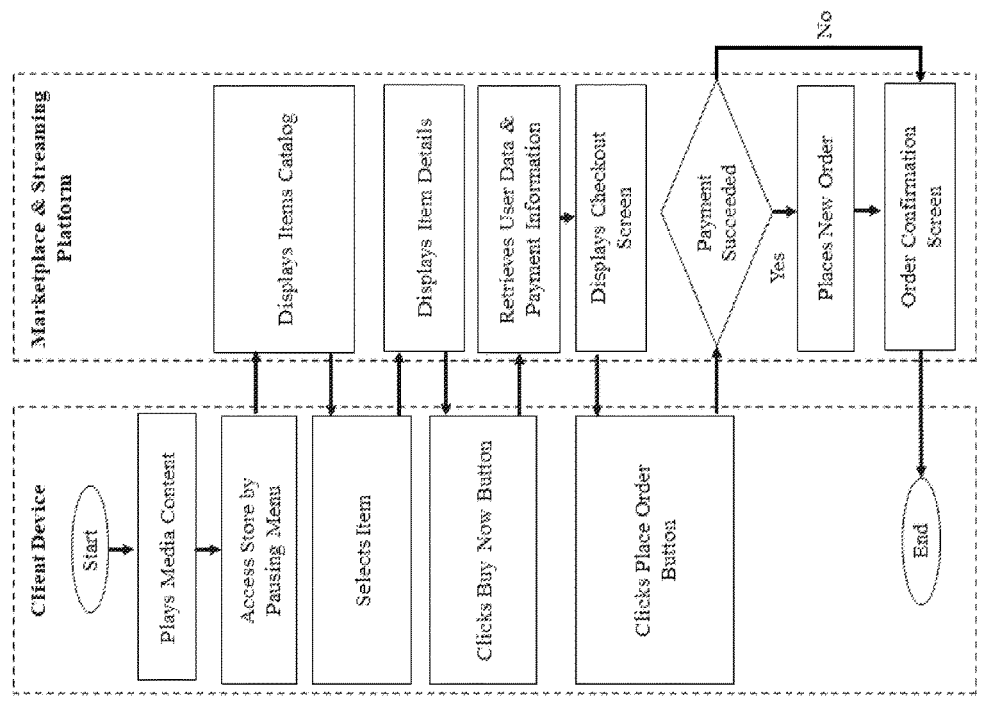
FIG. 8A depicts a system operating through pausing within a streaming media platform according to an embodiment of the present disclosure.

FIG. 8A depicts a system operating through pausing using an API according to an embodiment of the present disclosure. As depicted herein, using a client device, the user may play media content and then access a store by pausing the menu. The marketplace application may provide the user with an items catalog from which the user may select one or more items. The marketplace application may then provide the user with details about the selected item(s). The user may opt to purchase the one or more items by selecting a "buy now" button or other similar input mechanism. The marketplace application may then access the user data and payment information from the streaming media platform and display a checkout screen to the user. The user may then place his/her order, and payment may be processed.

Figure 8B:
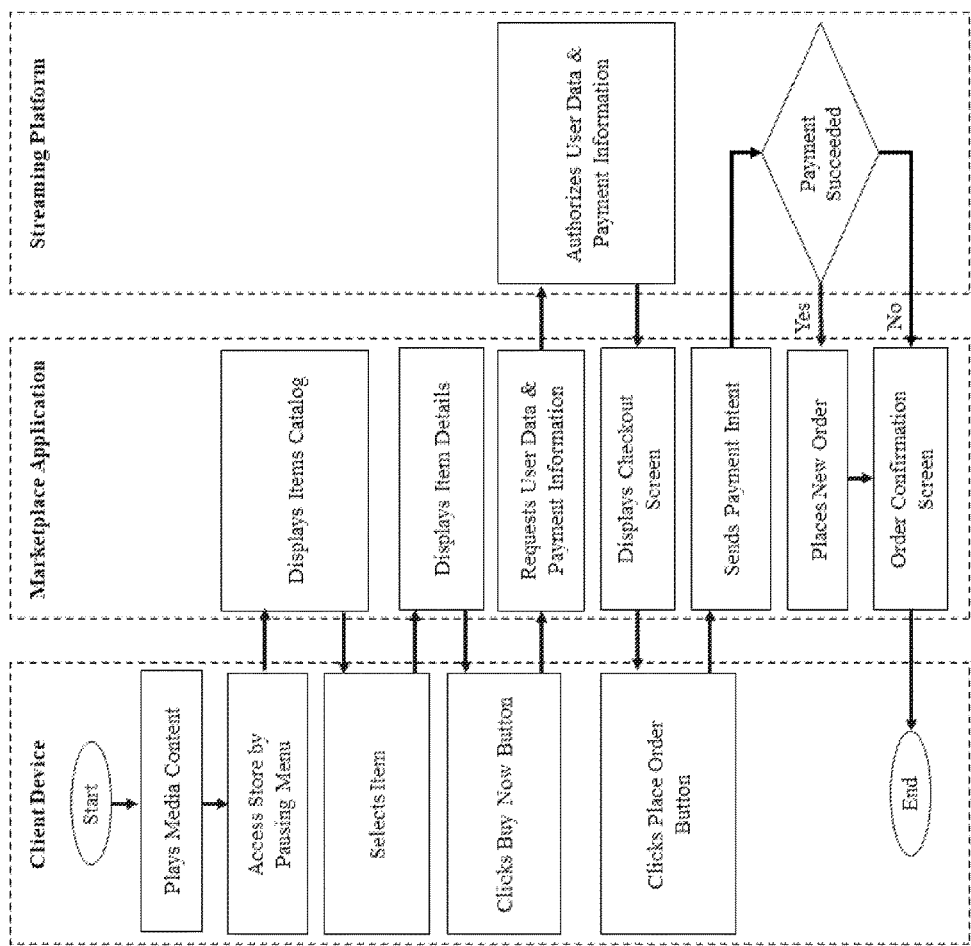
FIG. 8B depicts a built-in system operating through pausing according to an embodiment of the present disclosure.

FIG. 8B depicts a built-in system operating through pausing within a streaming media platform according to an embodiment of the present disclosure. As depicted herein, utilizing a client device, a user may play or access media content and then pause the menu to access a store within the marketplace and streaming platform. The marketplace and streaming platform may provide the user with an items catalog from which the user may select one or more items. The marketplace and streaming platform may then provide the user with details about the selected item(s). The user may opt to purchase the one or more items by selecting a "buy now" button or other similar input mechanism. The marketplace and streaming platform may then access the user data and payment information and display a checkout screen to the user. The user may then place his/her order, and payment may be processed.

FIGS. 9A-9H depict a method of using a system to pause within a streaming media platform to make a purchase. As depicted herein, a user may select studio 151 from which to access content within a streaming media platform (FIG. 9A) and then select a specific piece of content to access (FIG. 9B). The user may then start the content by selecting a "play" button or other similar input mechanism (FIG. 9C), and the content may start playing (FIG. 9D). The user may then elect to pause the content and select a shopping icon, such as shopping cart 255 depicted in FIG. 9D. Selection of the shopping cart may pause the content so that the user may be presented with one or more items available for purchase 118, 124, 127 (FIG. 9E). When a user selects an item, he/she may be presented with item details 89 and/or cost information 127a (FIG. 9F). The user may opt to purchase the one or more items using a buy now button or other similar input mechanism (FIG. 9F), and the user may be presented with shipment and payment details 117 (FIG. 9G). The user may select the "place order" button 92 or other similar input mechanism to complete the purchase (FIG. 9G). The user may be presented with a display indicating that the order has been completed (FIG. 9H).

Figure 10A:
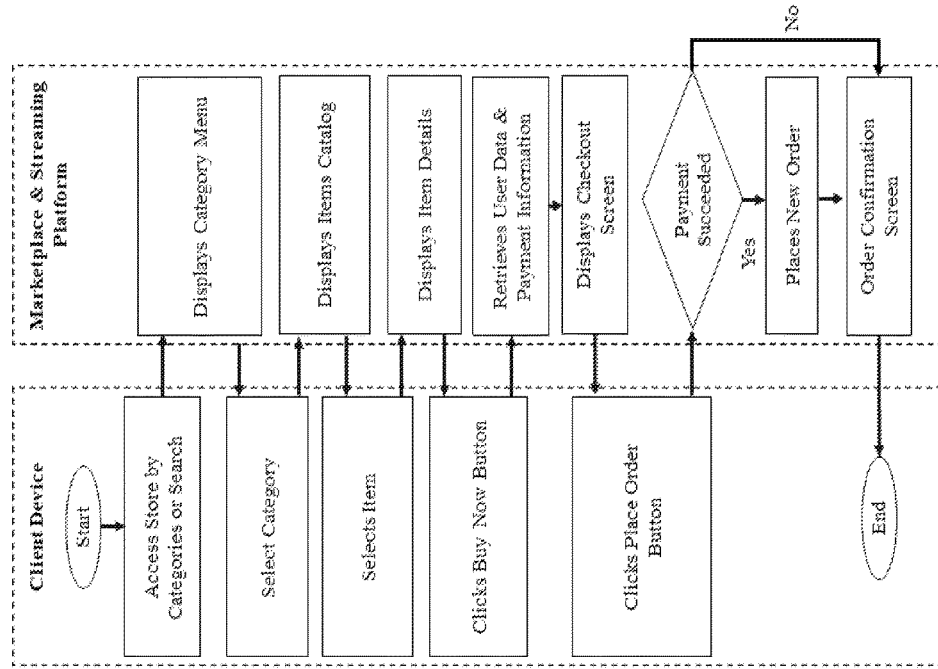
FIG. 10A depicts a system that provides for purchasing via categories or search according to an embodiment of the present disclosure.

FIG. 10A depicts a system that provides for purchasing via categories or search using an API according to an embodiment of the present disclosure. As depicted herein, using a client device, the user may access a store through categories or search. The marketplace application may display a categories menu to the user from which the user may select a category. The marketplace application may then display an items catalog from which the user may select one or more items. The marketplace application may then provide the user with details about the selected item(s). The user may opt to purchase the one or more items by selecting a "buy now" button or other similar input mechanism. The marketplace application may then access the user data and payment information, such as by accessing from the streaming media platform, and display a checkout screen to the user. The user may then place his/her order, and payment may be processed.

Figure 10B:
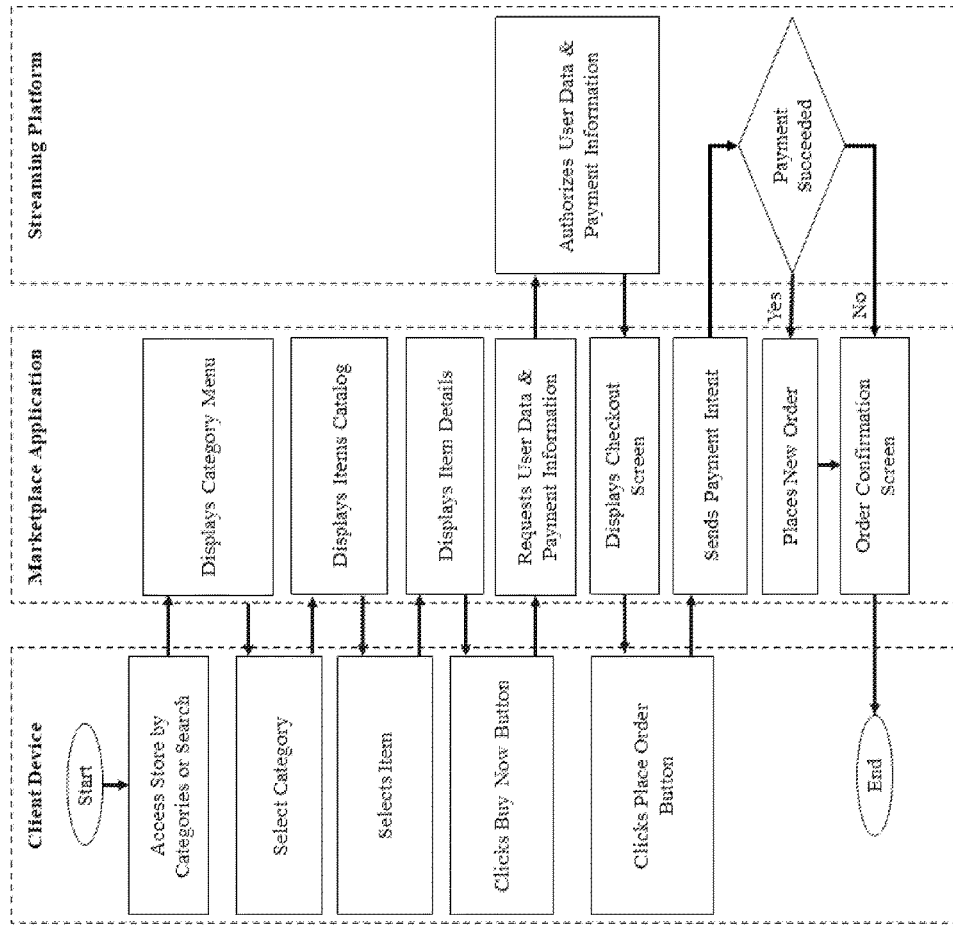
FIG. 10B depicts a built-in system that provides for purchasing via categories or search according to an embodiment of the present disclosure.

FIG. 10B depicts a built-in system that provides for purchasing via categories or search according to an embodiment of the present disclosure. As depicted herein, using a client device, a user may access a store within a marketplace and streaming platform via categories or search. The marketplace and streaming platform may provide a categories menu from which the user may select one more categories. An items catalog may be displayed in response to the category selection. The marketplace and streaming platform may provide the user with an items catalog from which the user may select one or more items. The marketplace and streaming platform may then provide the user with details about the selected item(s). The user may opt to purchase the one or more items by selecting a "buy now" button or other similar input mechanism. The marketplace and streaming platform may then access the user data and payment information and display a checkout screen to the user. The user may then place his/her order, and payment may be processed.

FIGS. 11A-11G depict a method of search and purchase using categories. As depicted herein, the user may access store 100b within a marketplace and streaming platform (FIG. 11A) and be presented with one or more categories (FIG. 11B). The user may select a category and be presented with a categories catalog corresponding to the category (FIG. 11C). The user may be presented with one or more items available for purchase 118, 127 related to the category (FIG. 11D). When a user selects an item, he/she may be presented with item details 89 (FIG. 11E). The user may opt to purchase the one or more items using a buy now button or other similar input mechanism (FIG. 11E), and the user may be presented with shipment and payment details 117 (FIG. 11F). The user may select the "place order" button 92 or other similar input mechanism to complete the purchase (FIG. 11F). The user may be presented with a display indicating that the order has been completed (FIG. 11G).

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A system for purchasing one or more items of merchandise associated with a content data provided by a streaming media platform, the system comprising:
a marketplace application comprising:
at least one database including a product catalog, marketplace application data, and business intelligence data;
at least one application programming interface (API) server that transmits a first information to and receives a second information from the at least one database; and
at least one marketplace application server that transmits a third information to and receives a fourth information from the at least one database; and
the streaming media platform, wherein the streaming media platform maintains the content data, user data, and payment information,
wherein the content data, the user data, and the payment information are transmitted by the streaming media platform to the at least one API server of the marketplace application in response to a request received by the streaming media platform from the marketplace application,
wherein the marketplace application is accessed by a subscriber of the streaming media platform through and within the streaming media platform using a client device,
wherein the marketplace application completes a purchase for the one or more items of merchandise associated with the content data provided by the streaming media platform within the marketplace application using the payment information received from the streaming media platform.

2. The system of claim 1, the client device comprising:
at least one content application that provides access to the streaming media platform; and
a graphical user interface (GUI) provided for the subscriber to view the content data, search for the one or more items of merchandise, and purchase the one or more items of merchandise within the marketplace application.

3. The system of claim 1, the streaming media platform further comprising:
a video source that includes media servers and cache services.

4. The system of claim 1, the user data comprising one or more of the following:
name, phone number, email address, username, password, interests, and preferences.

5. The system of claim 1, wherein the marketplace application is integrated into the streaming media platform.

6. The system of claim 1, the at least one API server further comprising:
an API Gateway Service.

7. The system of claim 1, the marketplace application further comprising:
one or more load balancers that facilitate transfer of client information between the marketplace application and the client device over a communication network.

8. The system of claim 1, wherein the subscriber accesses the marketplace application through a bar menu within the streaming media platform.

9. The system of claim 1, wherein the subscriber accesses the marketplace application through selection of a content title within the streaming media platform.

10. The system of claim 1, wherein the subscriber accesses the marketplace application through a home or main screen within the streaming media platform.

11. A method for purchasing one or more items of merchandise associated with a content data provided by a streaming media platform, the method comprising:
presenting, by a marketplace application to a client device of a subscriber of the streaming media platform, an items catalog associated with content provided by the streaming media platform;
receiving, by the marketplace application from the client device, a selection of the one or more items of merchandise associated with the content data provided by the streaming media platform;
sending, by the marketplace application to the streaming media platform, a request for user data and payment information associated with the subscriber;
in response to the request, transmitting, by the streaming media platform to an API server of the marketplace application, the user data and the payment information associated with the subscriber, wherein the streaming media platform maintains the content data, the user data, and the payment information;
receiving, by the API server of the marketplace application from the streaming media platform, the user data and the payment information associated with the subscriber;
confirming, by the marketplace application with the client device, that the subscriber opts to purchase the one or more items of merchandise; and
completing, by the marketplace application, a purchase of the one or more items of merchandise using the payment information received by the API server,
wherein the marketplace application is accessed by the subscriber through and within the streaming media platform.

12. The method of claim 11 further comprising:
presenting, by the marketplace application, a category menu from which the subscriber selects the one or more items of merchandise from the items catalog.

13. The method of claim 11, wherein the marketplace application is accessed by the subscriber through a bar menu within the streaming media platform.

14. The method of claim 13, further comprising:
requesting, by the marketplace application, the content data associated with the streaming media platform upon access of the marketplace application through the bar menu;
upon receiving authorization to access the content data, presenting, by the marketplace application, the subscriber with a studio menu from which the subscriber selects a studio and then a title associated with the studio; and checking for title merchandise associated with the title to identify the items catalog to present to the subscriber.

15. The method of claim 11, wherein the marketplace application is accessed by the subscriber through a selection of a content title within the streaming media platform.

16. The method of claim 11, wherein the marketplace application is accessed by the subscriber through a home or main screen within the streaming media platform.

17. The method of claim 16, further comprising:
requesting, by the marketplace application, the content data associated with the streaming media platform upon access of the marketplace application through the home or main screen;
upon receiving authorization to access the content data, presenting, by the marketplace application, the subscriber with a studio menu from which the subscriber selects a studio and then a title associated with the studio; and
checking for title merchandise associated with the title to identify the items catalog to present to the subscriber.

18. The method of claim 11, the marketplace application comprising:
at least one database including a product catalog, marketplace application data, and business intelligence data;
wherein the API server transmits a first information to and receives a second information from the at least one database; and
at least one marketplace application server that transmits a third information to and receives a fourth information from the at least one database.

19. The method of claim 11, the client device comprising:
at least one content application that provides access to the streaming media platform; and
a graphical user interface (GUI) provided for the subscriber to view content, search for the one or more items of merchandise, and purchase the one or more items of merchandise within the marketplace application.

20. The method of claim 11, wherein the marketplace application is integrated into the streaming media platform.

* * * * *